United States Patent [19]

Knipfer et al.

[11] Patent Number: 5,307,483
[45] Date of Patent: Apr. 26, 1994

[54] SYNCHRONIZATION INSTRUCTION FOR MULTIPLE PROCESSOR NETWORK

[75] Inventors: Diane L. Knipfer; Lynn A. McMahon, both of Rochester; Charlotte B. Metzger, Elgin, all of Minn.

[73] Assignee: International Business Machines Corp., Rochester, Minn.

[21] Appl. No.: 20,880

[22] Filed: Feb. 19, 1993

Related U.S. Application Data

[63] Continuation of Ser. No. 466,538, Jan. 17, 1990, abandoned.

[51] Int. Cl.5 .............................................. G06F 11/00
[52] U.S. Cl. ...................................... 395/575; 395/425; 395/650; 395/725; 364/230.4; 364/269; 364/271.2; 364/DIG. 1
[58] Field of Search .................. 364/931.48, 933.62, 364/942.4, 230.4, 269, 271.2; 395/325, 425, 575, 650, 725, 800

[56] References Cited

U.S. PATENT DOCUMENTS

| | | |
|---|---|---|
| 3,810,119 | 5/1974 | Zieve et al. ............... 340/172.5 |
| 4,344,133 | 8/1982 | Bruce, Jr. et al. . |
| 4,395,757 | 7/1983 | Bienvenu et al. ............... 364/200 |
| 4,409,653 | 10/1983 | Bruce, Jr. . |
| 4,412,303 | 10/1983 | Barnes et al. . |
| 4,663,709 | 5/1987 | Fujiwara et al. ............... 364/200 |
| 4,709,326 | 11/1987 | Robinson . |
| 4,783,736 | 11/1988 | Ziegler et al. . |
| 4,809,168 | 2/1989 | Hennessy et al. ............... 364/200 |
| 4,809,169 | 2/1989 | Sfarti et al. . |
| 4,816,990 | 3/1989 | Williams ............... 364/200 |
| 4,891,749 | 1/1990 | Hoffman et al. ............... 364/200 |
| 5,040,108 | 8/1991 | Kanazawa ............... 364/200 |
| 5,210,861 | 5/1993 | Shimoda ............... 395/575 |

OTHER PUBLICATIONS

*IBM Technical Disclosure Bulletin*, vol. 17, No. 6, Nov. 1974, C. D. Holtz, J. S. Liptay, et al., pp. 1686–1687.

Primary Examiner—Gareth D. Shaw
Assistant Examiner—Dennis M. Butler

[57] ABSTRACT

A computer program synchronization instruction is employed to synchronize multiple processing devices sharing main storage through a common interface. The processors execute the synchronization instruction in turn, and all except the final processor are forced into a temporary holdoff condition and execute no further computer program instructions. The final processor to execute the synchronization program becomes a master, releasing itself and the "slave" devices simultaneously to resume executing instructions. In order to force contentions between processors, a selected delay may be entered into the instruction stream of at least one of the processing devices. The delay can be incremented each time the synchronization instruction is executed, if desired. The forced contentions permit a testing of various serialization mechanisms designed to resolve contentions.

17 Claims, 8 Drawing Sheets

| TIME | PROCESSOR 18 | PROCESSOR 20 |
|------|--------------|--------------|
| t0   |              |              |
| t1   | MPSYNC       |              |
| t2   |              |              |
| t3   |              |              |
| t4   |              | MPSYNC       |
| t5   | OBI- FETCH   | OBI - FETCH  |
| t6   | - OR         | - OR         |
| t7   | - STORE (INIT) | - STORE (INIT) |
| t8   | - STORE (COMPLETE) |        |
| t9   |              | - STORE (COMPLETE) |

SYNCHRONIZATION INSTRUCTION FOR MULTIPLE PROCESSOR NETWORK

This is a continuation of application Ser. No. 07/466,538, filed on Jan. 17, 1990 now abandoned.

BACKGROUND OF THE INVENTION

The present invention relates to data processing networks in which multiple processing devices share an interface to main storage, and more particularly to a process for testing hardware and microcode serialization mechanisms in such networks.

Among the recent trends in data processing are computer architectures which increasingly employ multiple processing devices sharing a common interface to main storage. Multiple processor networks typically employ serializing mechanisms in order to protect shared objects in main storage. In other words, should two or more of the processors simultaneously request access to a shared area of data within main storage, one or more of the serializing mechanisms resolves the conflict and grants access to one of the requesting processors.

While the testing of serialization mechanisms is desirable and necessary to insure their reliability, such testing requires conflicting requests for a main storage shared object to overlap within a single clock cycle, a situation which rarely occurs at random and is difficult to force. There is no observable difference between conflicting processor requests executing in parallel (and being properly serialized by the serializing mechanisms), and the same instructions executing in sequence.

The general idea of forcing a conflict between processors is known. For example, IBM Technical Disclosure Bulletin, Volume 17, No. 6 (November 1974) discloses a process for synchronizing two processing devices, one designated as the local device and the other, the remote device. The local and remote processors execute different instructions, toward putting both of them in a "null" state during the same clock cycle, so that both processing devices begin executing the next instruction simultaneously. If both processors seek the same storage location, a locking mechanism designed to allow access to only one of the processors is tested.

Various means are known for synchronizing processing devices, although not necessarily in connection with testing locks or other serializing mechanisms. For example, U.S. Pat. No. 4,412,303 (Barnes et al) discloses a system including an array of processors, memory modules, a network connecting the processors and the memory modules, and a data base memory with a data base memory controller. The system also includes a coordinator for synchronizing the processors when parallel operation of the processors is desired.

U.S. Pat. No. 4,783,736 (Ziegler et al) discloses a system for governing multiple processors connected in parallel to a plurality of interleaved memory elements, with memory access patterns designed to insure a desired offset of the patterns, to avoid access conflicts. Various master and slave processing devices operate under different codes.

While these means of synchronization and the aforementioned testing approach are each satisfactory under certain circumstances, there has remained a critical need for synchronizing multiple processing devices, and utilizing this synchronization to achieve repeatable conflicts, between and among the processors, for shared objects in main storage.

Therefore, it is an object of the present invention to provide a means for placing multiple processors into a hold (non-executing) state, and subsequently to simultaneously release all processors from the hold state or condition.

Another object of the invention is to provide a computer program synchronization instruction executed by multiple processors, each in turn, toward achieving the hold state, that operates identically regardless of the order in which the processors execute the instruction.

A further object is to provide a means for selectively interposing a delay on one or more selected processors, following the synchronization of all processors.

Yet another object is to provide a means for incrementing such delay associated with one or more chosen processors to increase the delay by a selected amount, for example a single clock cycle, each time the synchronization instruction is executed.

SUMMARY OF THE INVENTION

To achieve these and other objects, there is provided a method of synchronizing used in a data processing network that includes a plurality of processing devices for executing computer program instructions to manipulate bit-encoded data, a shared resource for receiving and transmitting bit-encoded data, and an interface connected to the processors and to the shared resource for transmitting bit-encoded data between the processing devices and the shared resource. The system further includes a serializing means for resolving contentions for control of the shared resource among the processing devices.

In connection with this network, there is provided a process for verifying that the serializing means are functioning properly. The process includes the following steps:

(a) designating a limit to determine the number of the processing devices to be synchronized;

(b) forcing each of the processing devices into a hold condition in which the processing devices temporarily are prevented from executing any further computer program instructions, until the number of processing devices in the hold condition, designated as slave devices, is one less than the limit;

(c) using the remaining one of the devices, designated as the master device, to force itself into the hold condition, and then to simultaneously release itself and the slave devices from the hold condition, thus to enable all of the processing devices, both the master and the slaves, to begin executing computer program instructions.

If desired, the process can include a further step, after the master device releases all devices from the hold condition, of delaying at least one of the processing devices, relative to the others and for a selected amount of time, after the release and before the signaling of the delayed processing device.

The invention utilizes a means for providing a simultaneous signal to all processors to release them at exactly the same time from a hold condition. In the preferred embodiment of the invention, a particular serialization mechanism known as a class lock is employed in the synchronizing process. A class lock can be requested by any of the processing devices when attempting to gain access to a shared object in main storage associated with the particular class lock. The term "class lock" refers to the fact that the locking mechanism protects neither main storage as a whole, nor a particular data word in main storage, but rather a certain class or type of objects in main storage.

Class locks are utilized to perform step (c) in the process mentioned above. More particularly, once a particular processor becomes the master device, by virtue of being last in line among the processors involved, the master requests and acquires control of a plurality of the locks, equal in number to the limit. After acquiring the locks, the master device provides a synchronization message to all of the slave devices. Each slave, upon receiving the synchronization message, provides an acknowledgement message back to the master device and requests control of a uniquely associated one of the locks currently controlled by the master device.

Responsive to receiving acknowledgement messages from all of the slave devices, the master device requests the remaining one of the locks, thereby forcing itself into the holdoff condition along with the slave devices. The master device then releases control of the plurality of locks, thereby to simultaneously grant control of the locks to the processing devices. Releasing the locks signals the processing devices to begin executing the next computer program instructions, one such instruction associated with each of the processors.

Because all processors do not execute an identical "next instruction", and in fact each processor may execute a different instruction, the process of the present invention can include the following further steps:

after the signaling of all processing devices, observing that an access to the shared resource by a first one of the processing devices occurred prior to such access by a second one of the devices;

interposing a delay associated only with the first device, after the release of control over the locks and prior to the execution of the next computer program instruction, and performing all previous steps again, then observing access to the shared resource by the first and second processing devices;

if the first processor is detected to have gained access prior to the second processor once again, incrementing the delay to the first processing device and performing the preceding step once again; and repeating this until the second processing device is observed to gain access to the shared resource before the first processing device.

Thus, even if two processors are executing different instruction streams, the growing delay feature eventually causes the processors to contend for access on the same clock cycle, insuring an effective test of the serializing mechanisms.

Preferably, the process is performed pursuant to a computer program synchronization instruction comprising a 32-bit word having a plurality of data fields including a field for identifying the instruction as a synchronization instruction, and a field for identifying a location, within main storage, of a synchronization control block. The control block also is a 32-bit data word with a plurality of fields, including a control field for designating the limit, a control field for maintaining a current count of the number of processing devices that have executed the synchronization instruction with the control block, and a control field for identifying which ones of the processing devices have executed the instruction.

In connection with the growing delay feature, the synchronization instruction further includes a field for indicating the presence or absence of a delay, and a field for determining whether the value in the delay field is to be incremented each time the synchronization instruction is executed.

A salient feature of the present invention is that pursuant to one of the steps in the synchronization instruction, the number of processors determines the limit automatically, even if there are more instruction streams than processors to be synchronized. All of the processing devices are treated as peers, with no need to predetermine one or more of the processors as the master. Rather, master status is assigned dynamically to the final processor executing the synchronization instruction. The delay feature, whether constant or incrementing, can be uniquely associated with each one of the processors. Finally, all of the processors execute the same synchronization instruction, there being no need for a special instruction, e.g. for execution by the master device. Thus, the synchronization of the present invention, either alone or in combination with uniquely assigned fixed or growing delays, facilitates the forcing of contentions among the processors for shared objects in main storage, to facilitate a thorough and complete testing of serialization mechanisms.

IN THE DRAWINGS

For a further understanding of the above and other features and advantages, reference is made to the detailed description and to the drawings, in which.

DETAILED DESCRIPTION OF THE PREFERRED EMBODIMENT

To facilitate an understanding of the preferred embodiment, this description begins with a brief explanation of certain terms used to describe the operation and features of the invention.

IMPI Instructions: Assembly level computer program instructions in microcode. Processing devices execute IMPI instructions sequentially in performing logical operations on data, e.g. store, add, and move-character functions.

Horizontal Microcode (HMC): Microcode that interprets IMPI instructions, i.e. decomposes the IMPI instructions into a series of simpler steps. HMC instructions are also called control words, and govern the state of the hardware.

Hardware Class Locks: These locks serialize main storage fetches and stores among the processing devices. Each control word (HMC) has a lock control field, whereby a processor can gain control of any combination of up to ten locks.

Class Lock Functions: HMC can specify three functions concerning class locks:

(1) ADD a lock to a set of locks already held by a processor;

(2) RESET one or all locks currently held by the processor; and (3) SET a lock, including a RESET of all current locks, followed by an ADD of the chosen lock.

Class Lock Holdoff: When a particular processing device controls one of the class locks, another processor requesting the same lock cannot gain control of the lock, but rather is forced into a holdoff condition, in which the requesting processor executes no further HMC instructions. Holdoff persists until the requested lock becomes available, which occurs when the controlling processor completes outstanding stores or other activity, then grants possession of the requested lock by resetting the lock.

Hold Condition: A state in which a processing device executes no further IMPI instructions, while waiting for synchronization.

Processor Intercommunications Register (PIR): The PIR is a shared object (residing in processors, not in main storage) of the processing devices, through which a processor can send a message to the other processors, and through which such other processors can reply with an acknowledgement message, each by resetting its respective bit in the PIR.

Figure 1:
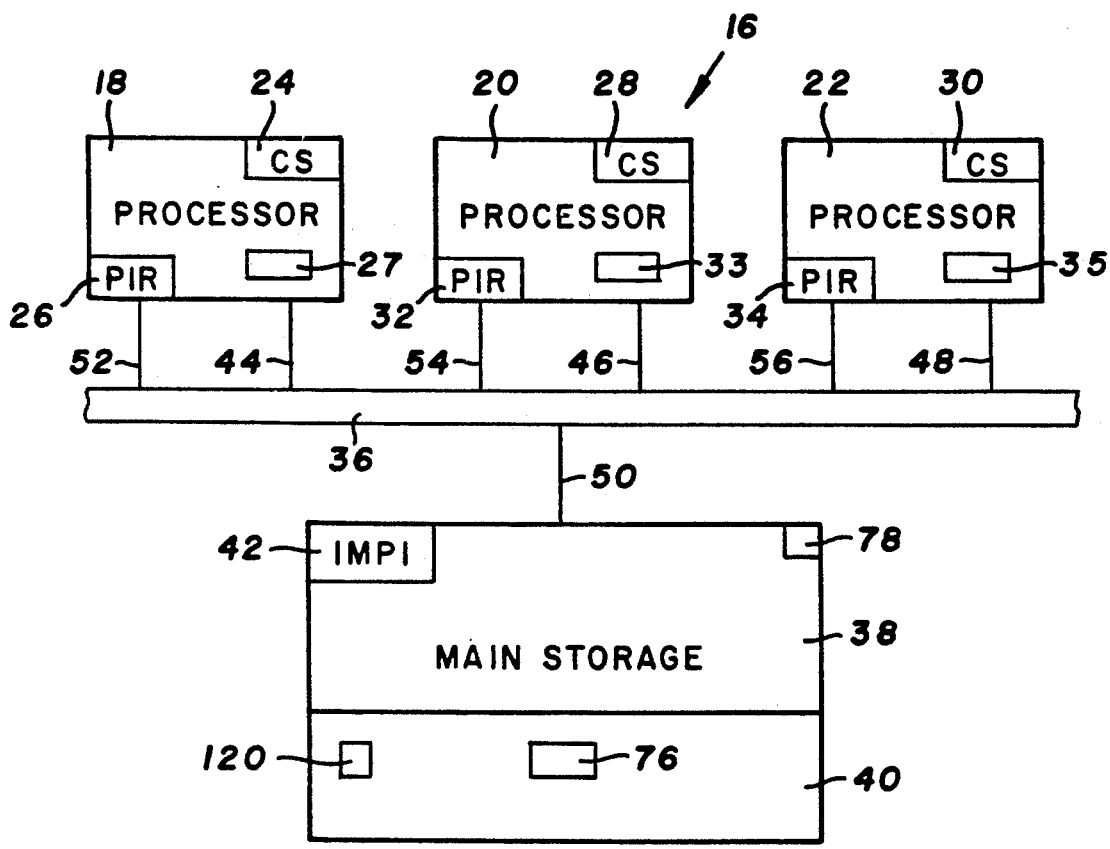
FIG. 1 is a schematic view of an information processing system in which multiple processing devices share main storage through a common interface.

Turning now to the drawings, there is shown in FIG. 1 an information processing network 16 for storing and performing various operations upon bit-encoded data. The network in this example includes three processing devices indicated at 18, 20 and 22, but more or fewer processing devices could be used. Processor 18 includes a control store 24 where the horizontal microcode resides, and a register segment 26 of the processor intercommunications register (PIR), and array of general-purpose IMPI registers 27. Processors 20 and 22 are similar, including respective control stores 28 and 30 containing the horizontal microcode, and respective register segments 32 and 34 of the PIR, and IMPI registers 33 and 35. The processing devices further include necessary circuitry for sending bit-encoded data to the main storage memory or other parts of network 16, receiving data from other areas of the network, and for generating commands for carrying out such data transmissions. It is to be understood that the configuration of processing devices in this network could include multiple processing devices.

An interface 36 connects the processing devices with a main storage memory 38, which includes memory arrays 40 for storing bit-encoded data and a program instruction store 42 in which the IMPI instructions are embedded. Preferably, main storage memory 38 is comprised of multiple individual memory cards, each having its own memory arrays and its own instruction store segment, the segments cooperating to provide the IMPI instructions.

Interface 36 can include a plurality of separate busses (not shown) in parallel, each shared in common by all of the processing devices and the memory cards of main storage. For example, working data (the information of most direct concern to users of the network) is transmitted over a working data bus, a command/address bus transmits information controlling the transmissions of working data, including information as to the address in main storage memory 38 at which working data is to be stored or retrieved, and a communication bus for transmitting the status of working data as the working data is transmitted via the data bus. Data lines 44, 46, and 48 connect processing devices 18, 20 and 22 to interface 36. A data line 50 connects the interface to main storage, although in the case of multiple memory cards, each card has its own such data line to the interface. PIR lines 52, 54 and 56 associate PIR segments 26, 32 and 34 with the interface, thus to enable each processing device to communicate with the other processing devices.

An operation on bit-encoded data is "atomic" if it appears to be calculated instantaneously from the inputs. In connection with main storage, an operation appears atomic if its source operands are not allowed to change from the time that they are fetched from main storage memory 38, to the time that results of the operation are stored back to main storage. The stored results are then correct for the inputs at the time of store. In a network with multiple processing devices, operations can be insured to be atomic only if conflicting attempts among processors to gain access to main storage, are detected and delayed until an operation underway is complete. Yet, performance of network 16 is enhanced if the number of atomic operations is kept to a minimum. Accordingly, most IMPI instructions are not atomic per se. Rather, selected IMPI instructions are atomic only relative to other instructions that operate on the same type of shared objects in main storage memory 38. IMPI operations involving such instructions are therefore deemed "relatively atomic operations". For such operations, the inputs are not changed by another operation in the set between the time an operation first references an input and the time the operation stores its results. Shared objects are divided into object classes, each of which is protected by one of the class locks.

Figure 2:
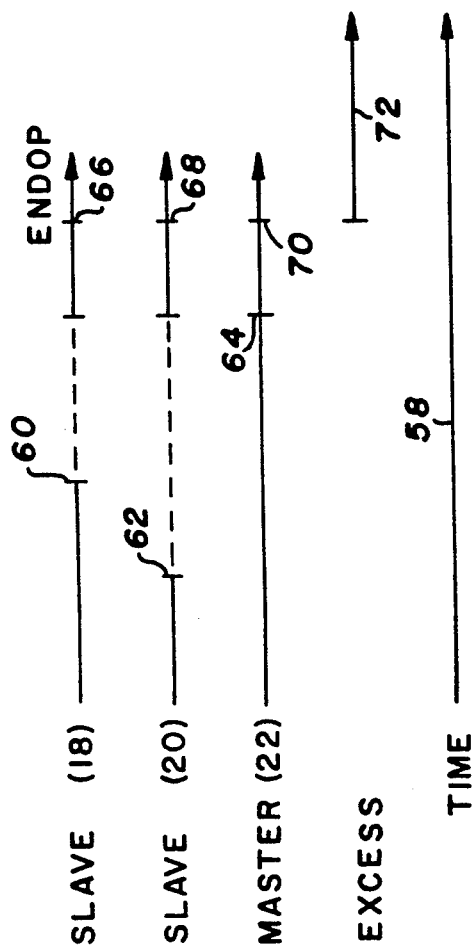
FIG. 2 is a timing diagram illustrating synchronization of multiple processors of the system in FIG. 1, in accordance with the present invention.

With the above in mind, synchronization testing in accordance with the present invention can be explained in general with reference to FIG. 2, with activity of processing devices 18, 20 and 22 depicted along with a time line 58.

As mentioned previously, one of the difficulties inherent in testing serialization mechanisms is that test results appear identical for situations in which such mechanisms were required and functioned properly, and for situations in which the mechanisms were not required at all, since potential competing operations did not overlap. To overcome this difficulty, the present testing scheme causes each of the processors to execute a synchronization instruction designated MPSYNC. The MPSYNC instruction is used to synchronize two or more IMPI instruction streams to within one clock cycle of each other, each of the instruction streams being associated with one of the processing devices.

When each of the processing devices executes the MPSYNC instruction, as indicated at 60 and 62 for processors 18 and 20, respectively, it is forced into a hold condition in which it temporarily ceases to execute further IMPI instructions. All processing devices, except the final device to execute a MPSYNC instruction, assume the hold condition, and are deemed slave devices. The final processing device to execute the MPSYNC instruction is the master device. As indicated at 64, processing device 2 is the last to execute this instruction and thus becomes the master. It is to be understood that any of processing devices 18, 20 and 22 could have been the master, since the master status depends solely upon the order in which the processors execute the synchronization instruction. None of the processing devices is predestined to become the master device.

Once the master device executes the MPSYNC instruction, it communicates to all slave devices to continue their instruction stream execution, at which time the horizontal microcode on each processor executes an "end-operation" (ENDOP) instruction. The synchronized ENDOP instructions force execution of the next instruction in each stream to begin on the same clock cycle, shown as an alignment of "resume" locations 66, 68, and 70, or the ENDOP instruction can be offset by a specified amount in connection with a delay feature to be explained.

This synchronization test is independent of the particular hardware configuration, in providing automatic adjustment to a situation in which the number of instruction streams executing the MPSYNC instruction is greater than the number of processing devices, for example four or more instruction streams in connection with FIGS. 1 and 2. In this event, only the number of instruction streams equal to the number of processors is synchronized. This prevents deadlock due to all processing devices assuming the slave state, with none remaining to assume the master role. The synchronization instructions in the remaining streams are executed as nonsynchronization instructions. The following instructions are serialized by contention for a processor rather than by the serialization mechanisms being tested, as indicated by the line 72 labeled "excess" in the figure. The synchronization test is further independent from hardware in that a limit of instruction streams to be synchronized can be set at less than the number of processors in the network. Again, this prevents deadlock due to all instruction streams entering the slave state.

Figure 3:
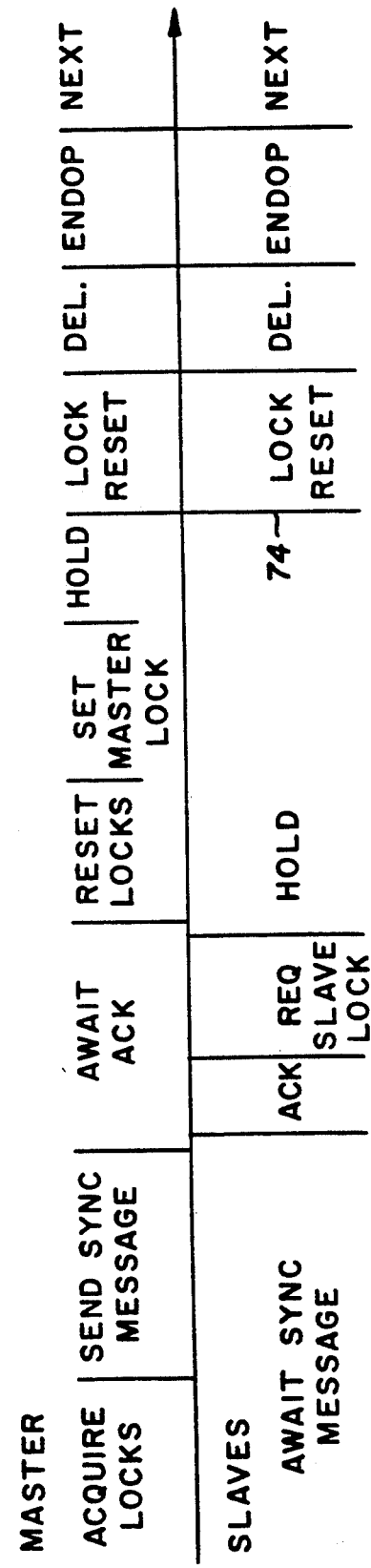
FIG. 3 is a timing diagram illustrating the synchronization in greater detail.
Figure 6:
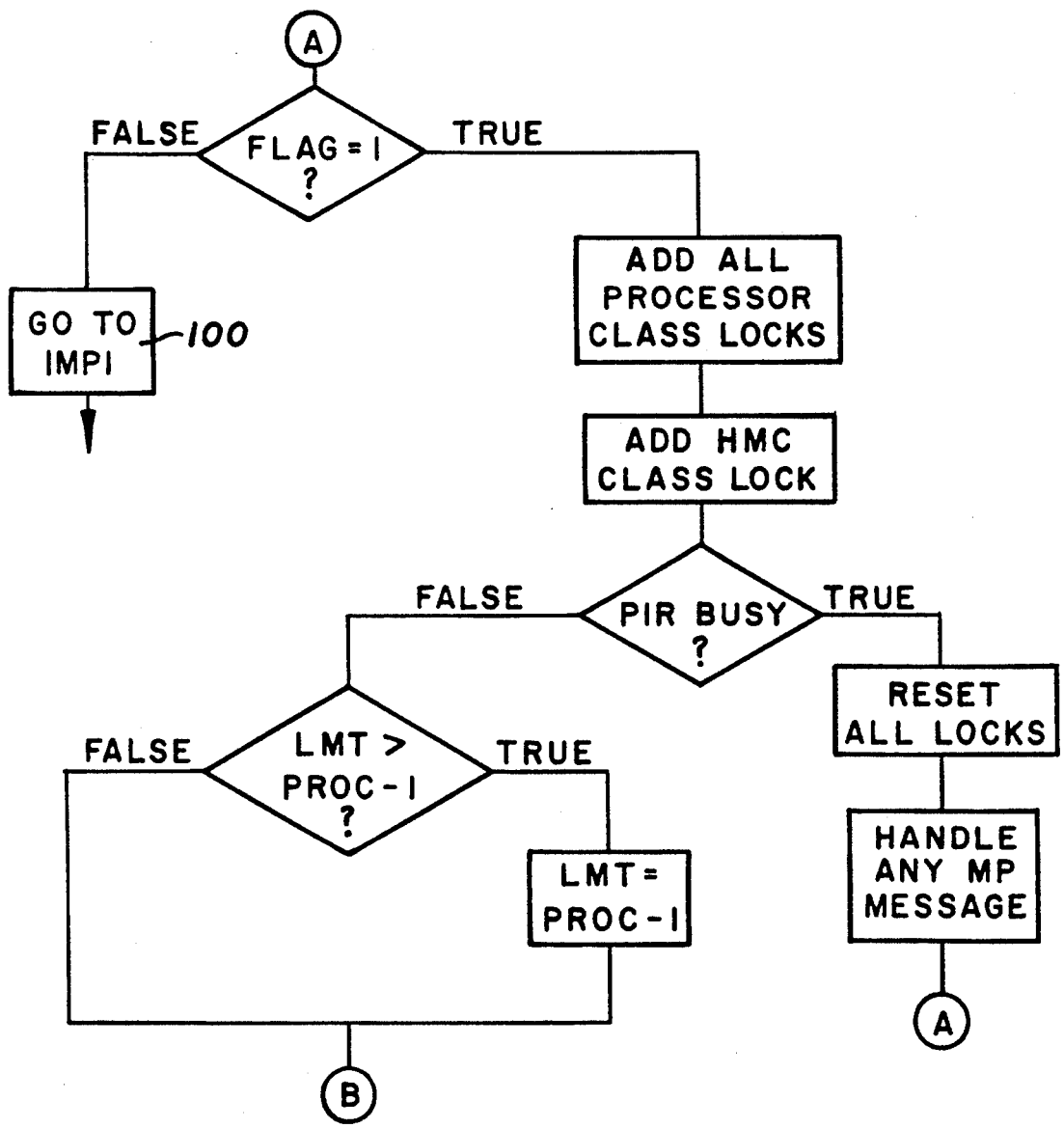
FIGS. 6 through 9 are sections of a flow chart illustrating the synchronization instruction in detail.
Figure 7:
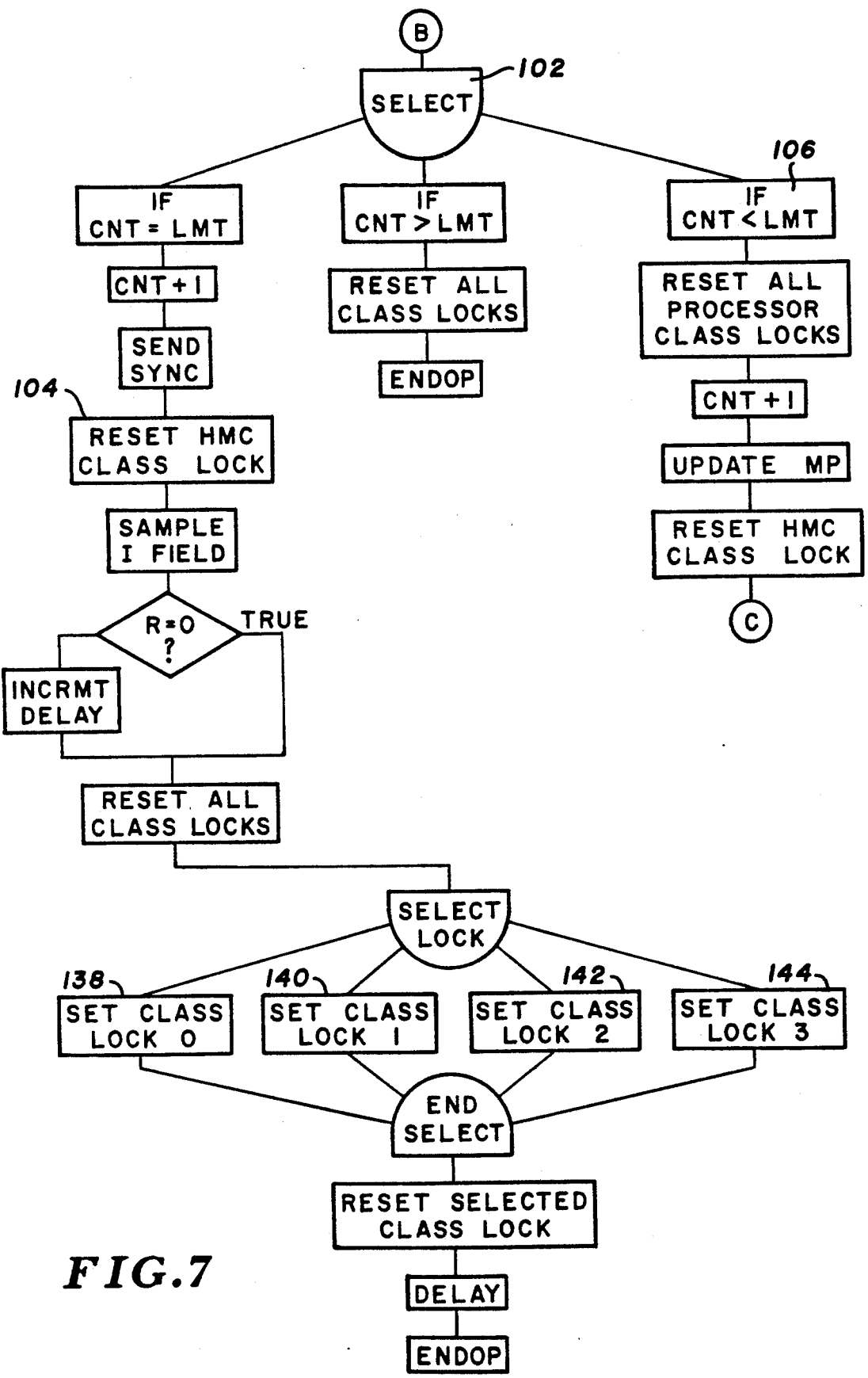
Figure 8:
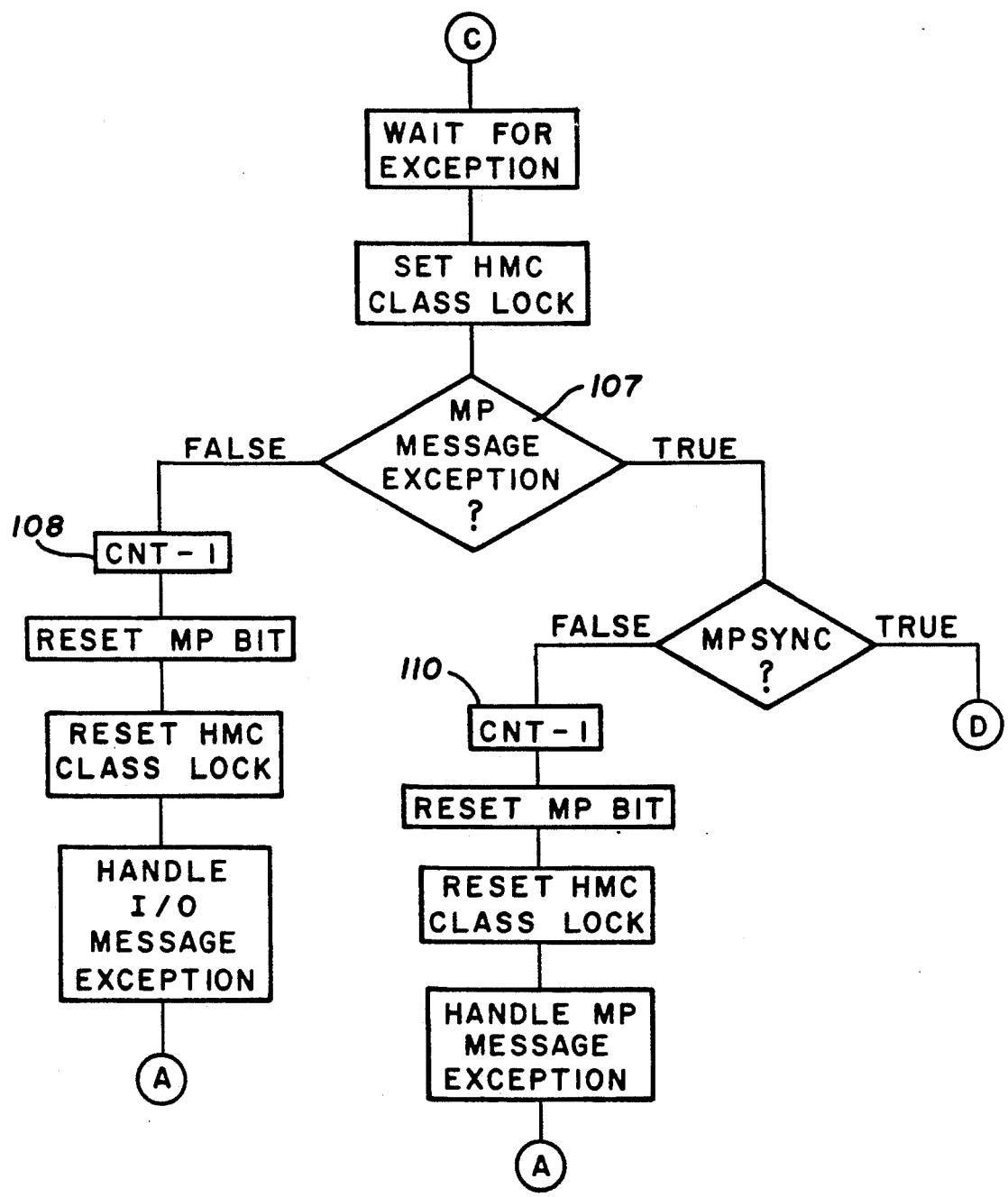
Figure 9:
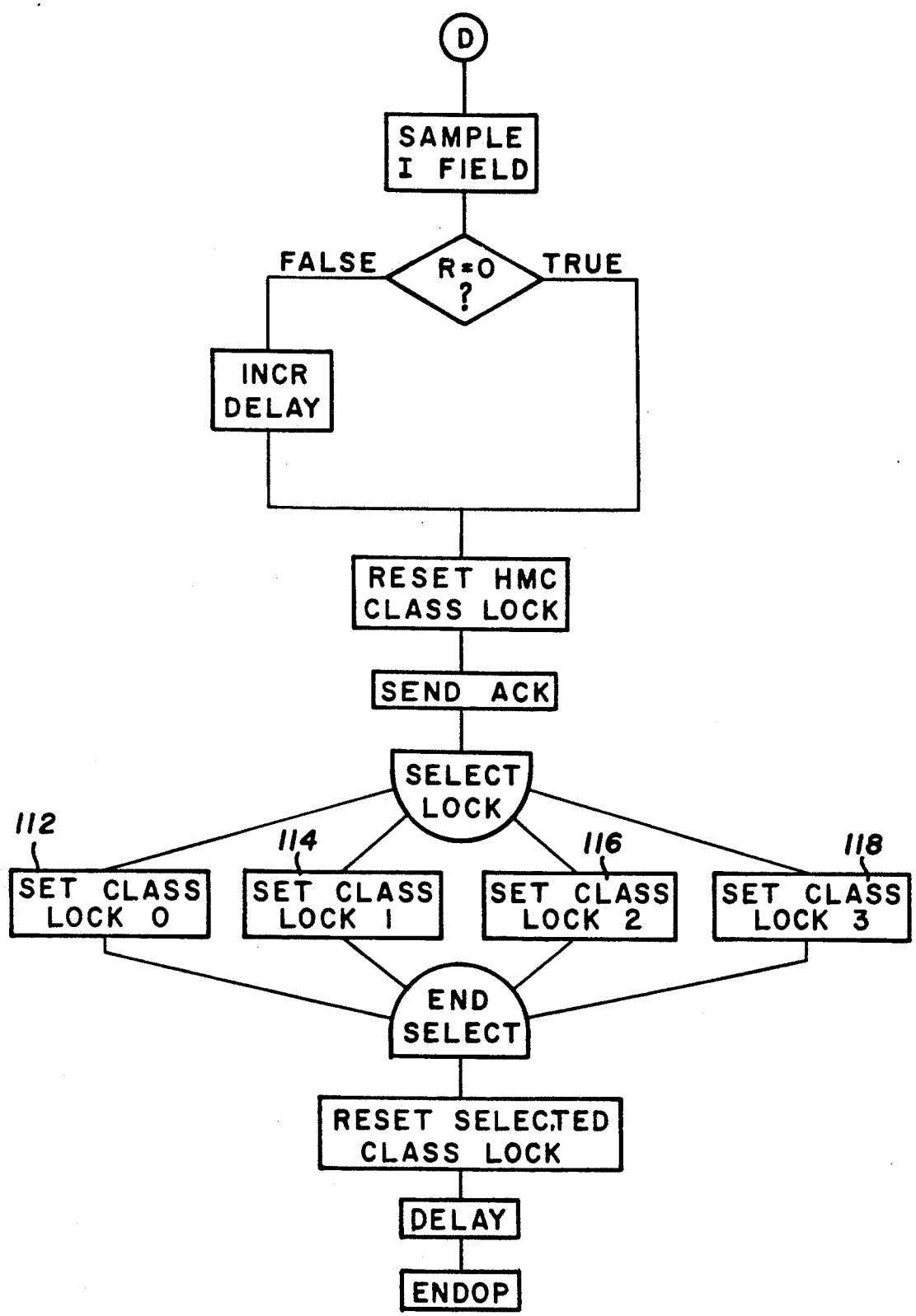

FIG. 3 illustrates in greater detail the events from the time the master device "learns" that it is the final processing device to execute the MPSYNC instruction, and the coordinated resumption of activity among all processing devices With the slave devices in a hold condition awaiting a message from the master device, the master device acquires hardware class locks, the number of required locks being equal to the number of processing devices involved (the master plus all slaves). Each processing device is uniquely associated with one of the class locks. Once the master device controls the required number of locks, it sends a synchronization message to all slave devices via the processor intercommunication register (PIR), then awaits acknowledgement from the slave devices.

Each slave device, upon receiving the synchronization message, replies with an acknowledgement message via the PIR, and also requests control of its own class lock. Such request forces the requesting slave device into the class lock holdoff condition, since the requested lock is currently controlled by the master device.

The master device, upon receiving the acknowledgement message from all of the slave processing devices, issues a command to reset all of its locks. In the next clock cycle, before the system hardware is able to reset the locks in response to the command, the master device requests its own lock again. This forces the master device into the class lock holdoff condition along with the slave devices. When the network hardware actually resets all locks, all locks simultaneously are granted to the processing devices, at a synchronization moment 74. FIG. 3 indicates a delay after the synchronization moment for each of the processors. This delay is selected individually for each processing device, and can be zero. In any event, each of the processing devices resets its associated class lock, optionally delays, and executes the ENDOP instruction, then begins to execute the next instruction in its stream on the next clock cycle.

To achieve synchronization, all involved processors execute the MPSYNC instruction with a shared synchronization control block 76 contained in main storage memory 38. Control block 76 is one of a plurality of such blocks, but only one such block can be used for a given synchronization point. Once all instruction streams have used the control block, it may be reinitialized (reused). Each processor, upon encountering the MPSYNC instruction, (1) updates control block 76 to indicate that it is awaiting synchronization, (2) examines the control block count field 92 to determine the number of waiting processors, and (3) examines the control block to determine the number of instruction streams to be synchronized (the lesser of the number specified in the control block, and the number of processors).

Figure 4:
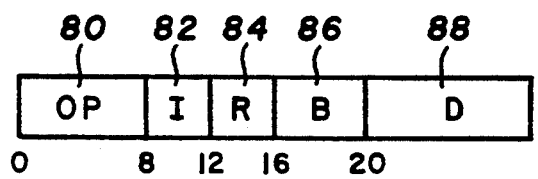
FIG. 4 is a representation of the format of a 32-bit synchronization instruction used in synchronization of the processors.
Figure 5:
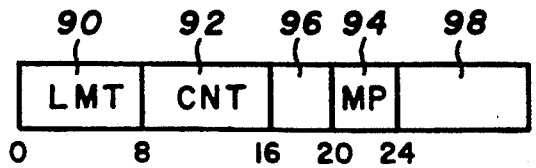
FIG. 5 is a representation of a 32-bit synchronization control block format used in synchronization.

The formats of the MPSYNC instruction and the synchronization block are illustrated respectively in FIGS. 4 and 5. A flag bit, residing in an area 78 of main storage reserved solely for horizontal microcode use, is set to a logical one when the synchronization test is to be performed, so that an OPCODE field 80 (bits 0-7) will be interpreted to designate a synchronization instruction, as opposed to a "normal" IMPI instruction used during usual operating, non-testing conditions. The field 82 labeled "I" relates to the delay feature. The first bit (bit position 8) of this field is set if a growing delay is requested. The field 84 labeled "R" is used in connection with the "I" field. The four-bit operand in the "R" field specifies a half-word IMPI register, i.e. one of registers 27, 33 and 35 in processors 18, 20 and 22, respectively, containing the number of cycles that should be built into the growing delay feature. If field 82 has not been set to request a growing delay, field 84 is ignored. The final fields 86 and 88, labeled "B" and "D", specify the location of four-byte synchronization control block 76 in main storage memory 38. The 4-bit "B" field is used to select a six-byte IMPI base register, with the "D" field indicating a 12-bit displacement. The location of the control block is specified by the sum of the displacement and the contents of the base register.

The synchronization control block includes a limit (LMT) field 90 for designating the number of instruction streams to be synchronized. In particular, the limit is set to equal the number of instruction streams to synchronize minus one. If the limit is greater than the number of processors minus one, the horizontal microcode automatically replaces the value in this field with the number of processors minus one, at the time of execution of the MPSYNC instruction.

A count (CNT) field 92 is used by the horizontal microcode to maintain a current count of the number of instruction streams that have executed the synchronization instruction with control block 76. The count in this field (bits 8-15) must be initialized to zero before the initial instruction stream can execute the MPSYNC instruction.

A field 94 labeled "MP" is used to keep track of which of the processing devices have executed the synchronization instruction with control block 76. Each bit in this field (20-23) is associated with one of the processors. As each processor executes the synchronization instruction, its associated bit in the MP field is set, providing a means to observe which of the processors have executed the synchronization instruction. The final, master processing device uses this field to identify all slave processing devices, to which the synchronization message is sent after the master acquires the necessary number of class locks. The MP field must be initialized to zero before the initial instruction stream can execute the MPSYNC instruction. The remaining fields 96 and 98 are unused.

FIGS. 6-9 are segments of a flow chart useful in understanding further details of the synchronization process, performed with four processors numbered 0-3. The instruction is initiated at "A" in FIG. 6 in seeking the flag bit at area 78 in main storage. A reset flag bit indicates a normal operating IMPI instruction rather than the MPSYNC instruction, and the "test" is complete as indicated at 100.

If the flag bit indicates a synchronization instruction, then the processor requests control of all processor class locks. Additionally, the processor requests control of a horizontal microcode class lock (which is not one of the class locks associated with any processor) to act as a semaphore to protect the processor intercommunications register and synchronization control block.

If PIR is busy (controlled by another processor), all locks are reset, any incoming message is handled, and the instruction begins again. If PIR is not busy, the number of processors is compared to the number in LMT field 90. If the number of processors minus one is less than the number currently in the LMT field, this number is adjusted downwardly to equal the number of processors minus one.

The next step is a selection 102 (FIG. 7), based upon a comparison of the contents of the limit and count fields in control block 76. Equal values in the count and limit fields indicate that the processing device is the master. The count in field 92 is incremented, the master device sends the synchronization message to all slave devices via the processor intercommunications register (PIR), the horizontal microcode lock is reset at 104, and the master device awaits the acknowledgement message from all slave devices. Next, "I" field 82 of the synchronization instruction is sampled for a growing delay and, if indicated, the delay value in the IMPI register specified by the "R" field 84 of the instruction is incremented. The master device resets all locks, then sets its own associated lock. The class lock selected in this regard is the one uniquely associated with that device, as indicated at 138, 140, 142 and 144 in FIG. 7. At the moment of synchronization, control of the requested class locks is granted to all processors simultaneously. After the moment of synchronization, the master device resets its class lock and, if a delay was specified, the master is delayed "N" cycles as determined by the current delay value. The master then executes the ENDOP instruction to continue instruction stream execution.

When the value in count field 92 exceeds the value in limit field 90, the excess instruction stream function is indicated. All locks are reset, ENDOP is generated and the instruction streams continue.

When the count value is less than the limit value, as indicated at 106, the processing device is a slave. All class locks except the HMC lock are reset. Then, the count field is incremented by one, and the bit associated with the processor executing the instruction is set in MP field 94 of control block 76. Then, the horizontal microcode (HMC) class lock is reset.

The processor then waits for an exception. When one occurs, the HMC class lock is set. The next determination 107 (FIG. 8) is whether a multiprocessor (MP) message exception is detected, indicating a message was sent via the PIR from another processor. If not, an I/O exception rather than a MP message exception is indicated, and the processor must rescind its slave status. The counter is decremented at 108, the bit associated with the current processor is reset in MP field 94 of the control block, the HMC lock is reset, and the I/0 message exception is handled. The synchronization instruction is reinitiated and the slave/master/excess selection at 102 is done again, possibly with different results if another processor executed the MPSYNC instruction while the I/O message exception was handled.

Returning to a decision at 107, if a MP message exception is detected, it may or may not relate to a synchronization message. If it does not, the processor must rescind its slave status. The count field "N" is decremented at 110, the current processor's bit in the MP field is reset, and the HMC class lock is reset. The MP message exception is handled, and the synchronization instruction is reinitiated, as previously described for an I/O message exception.

If the MP message exception relates to a synchronization message, then the "I" field is tested for a growing delay in connection with the device (a slave device) currently executing the synchronization instruction. The delay value in the IMPI register indicated by "R" field 84 is incremented in the case of a growing delay. The HMC class lock is reset, the slave device provides an acknowledgement to the master device, and the slave device requests control of its class lock. The class lock selected is the one uniquely associated with that device, as indicated respectively at 112, 114, 116 and 118. This class lock is currently controlled by the master device and thus places the slave device in the holdoff condition. When control of the lock is granted to the slave, all processors are synchronized. The slave then resets its class lock. Then a delay if any, pursuant to the contents of the associated "I" field and the delay value, is interposed, after which the ENDOP instruction is executed to continue instruction stream execution.

The synchronization moment, followed by the ENDOP instructions, simultaneously initiates "next" IMPI instructions on all of the processing devices. If such next instructions are identical, then no delay is necessary, since such instructions will run an identical course to a contention for a shared object. However, the situation of identical instructions may not occur, necessitating insertion of a predetermined delay into the stream of at least one of the processing devices to force contention. However, it is difficult to predetermine the delay necessary to force the contention. Accordingly, the above described growing delay feature can be used to insure that contention has been forced between two selected processing devices.

Assume, for example, that processing devices 18 and 20 are attempting an "EN-QUEUE" and a "DE-QUEUE" function upon a shared object or location 120 in main storage 38, in each case as the next instruction after ENDOP. The shared object can be a word in main store 38, or anything "simultaneously visible" to all of the processors. Assume further that processing device 18 gains access to the shared object and performs its function first, i.e. there is no contention. To force contention, a delay is introduced (utilizing the "I" field and "R" field discussed above) into the instruction stream associated with processing device 18. For growing delay, a selected value such as one clock cycle is added to the IMPI register specified by the "R" field. Then, the instruction stream is executed repeatedly, incrementing the delay by one clock cycle with each execution of the synchronization instruction. Eventually, it is observed that processor 20 rather than processor 18 gained access to the object first. Thus, processors 18 and 20 have been skewed relative to one another through the point of forced contention.

In connection with the synchronization message and acknowledgement messages, it should be noted that the processor intercommunications register is not essential, as these messages could be provided by the processing devices through shared main storage. However, providing and using the PIR for these messages eliminates considerable overhead on the interface busses, and for this reason is a significant advantage.

Figure 10:
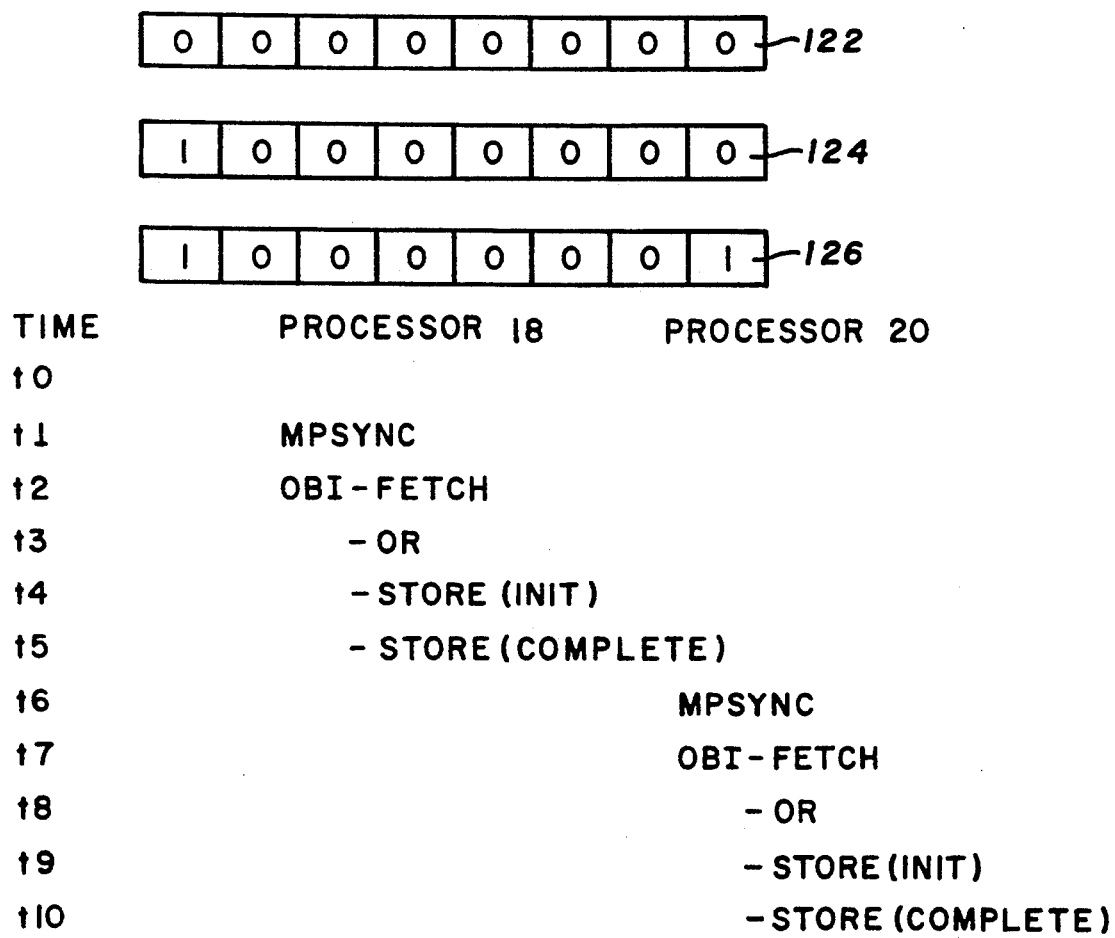
FIGS. 10 and 11 illustrate, respectively, failed and true results of a contention for shared main storage forced in accordance with the present invention.
Figure 11:
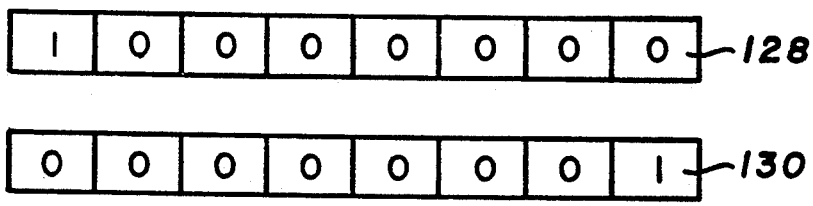

Proper functioning of the synchronization mechanism can be verified by using it to synchronize interfering non-atomic IMPI instructions. FIGS. 10 and 11 illustrate results showing, respectively, a failure to synchronize instruction streams and a successful synchronization. In each case, a data byte 122 has all eight bit positions reset at clock cycle t0, i.e. all logical zeros. At clock cycle t1, processor 18 executes the MPSYNC instruction. If the synchronization mechanism fails, rather than awaiting a synchronization message from a master processor, processor 18 continues its instruction stream, beginning execution of an OR byte immediate (OBI) instruction on the data byte during cycle t2. The OBI instruction includes three steps:

a fetch of data from main storage at t2, performance of the OR operation by a processor at t3, then a store of a result (indicated at 124) back to main storage at t4 and t5. (Contention for access to main storage can cause the store to be initiated during cycle t4 but not be complete until the subsequent cycle t5). The OBI instruction is not atomic. No serialization is done to prevent simultaneous access of shared data.

Processor 20 executes the MPSYNC instruction during cycle t6, and performs an OBI instruction during cycle t7 through t10. As indicated at 126, the final result includes logical ones in the first and final bit positions.

By contrast (FIG. 11), when the synchronization process is functioning correctly, processor 18 executes the MPSYNC instruction at clock cycle t1 as before, but assumes the hold condition awaiting the synchronization signal from a master device. In this case, processor 20 executes the MPSYNC instruction at cycle t4 and provides the synchronization instruction, so that both processors initiate the respective OBI instructions during clock cycle t5. Both processors fetch the same data 122 during clock cycle t5, perform the OR operation during clock cycle t6, and initiate the storing of results during clock cycle t7.

The store of the results of processor 18, indicated at 128, is complete in cycle t8. The store of processor 20 is delayed by contention for main storage access, and thus is not complete until cycle t9. The resulting byte 130 has a logical one only in its final position, reflecting the fact that processor 20 was allowed to perform the fetch operation upon the data before processor 18 had completed its store operation, i.e. a successful synchronization.

For more than two processors, each instruction stream sets a different bit in byte 122. If the OBI instructions occur serially, then the resulting data are an accumulation of set bits, as illustrated in FIG. 10. If synchronization is successful, all instruction streams simultaneously fetch byte 122, update the data and write new data into main storage, each without accumulating the results from the other processors' activity. The instruction stream corresponding to the final write back into main storage eliminates the results stored by preceding instruction streams, the result illustrated in FIG. 11.

When the MPSYNC instruction is used to test serialization mechanisms, the OBI instructions would be replaced with relatively atomic instructions. Resulting data that shows the cumulative results of all processors, as illustrated by FIG. 10, would indicate proper serialization. Non-cumulative results, as illustrated in FIG. 11, would indicate failure to serialize.

Thus, use of the MPSYNC instruction by multiple processors enables synchronization of multiple instruction streams to verify that the serializing mechanisms of the processors are functioning correctly and that the horizontal microcode is using the serializing mechanisms correctly. The synchronization tests can be performed independently of the number of processors available, due to the automatic adjusting feature which sets the limit value to the number of processors minus one, if necessary. With the growing delay feature, tests are independent of the precise path lengths of various instructions. Further, the test discussed in connection with FIGS. 10 and 11 insures that the synchronization instruction can be used to verify that hardware class locks are implemented properly, even though the class locks themselves are used in the test.

What is claimed is:

1. In a data processing network including a plurality of processing devices for executing computer program instructions in the form of computer program instruction streams to manipulate bit-encoded data, said processing devices executing different corresponding ones of the instruction streams, a shared resource for receiving and transmitting bit-encoded data, and an interface connected to the processors and to the shared resource for transmitting bit-encoded data between the processing devices and the shared resource; said system further including a serializing means for resolving contentions for control of the shared resource among the processing devices; a process for synchronizing the execution, by the processing devices, of their respective corresponding instruction streams to test the serializing means, including the steps of:

(a) setting a limit representing one less than the number of the processing devices to be synchronized;

(b) after setting the limit, causing a number of the processing devices equal to said limit, to enter a hold condition in which the processing device temporarily is prevented from executing computer program instructions, while remaining capable of sending and receiving bit-encoded data in the form of messages, all of said number of the processing devices being designated as slave devices;

(c) with all said slave devices in the hold condition, using one of the processing devices other than the slave devices, designated as the master device, to maintain the slave devices in the hold condition and to force itself into the hold condition while the slave devices are in the hold condition, and then using the master device to simultaneously release itself and the slave devices from the hold condition, enabling all of the processing devices to resume executing their corresponding ones of the computer program instruction streams.

2. The process of claim 1 wherein the serializing means includes a plurality of hardware class locks, and wherein step (c) includes the steps of:

(d) using the master device to acquire control of a number of the hardware class locks equal to one more than said limit;

(e) using the master device to provide a synchronization message to all of the slave devices, after the master device has acquired the hardware class locks;

(f) causing each of the slave devices, responsive to receiving the synchronization message, to provide an acknowledgement message back to the master device and to issue a request for control of a different one of the hardware class locks currently under control of the master device, thereby maintaining each slave in the hold condition;

(g) causing the master device, responsive to receiving the acknowledgement messages from all of the slave devices, to issue a reset command to release the hardware class locks and a request for a remaining, unrequested one of said hardware class locks, thereby to force the master device into the hold condition along with the slave devices, each device requesting control of its associated one of the hardware class locks; and (h) causing the master device to release control of the plurality of hardware class locks in response to the reset command, thereby to simultaneously release the hardware class locks to the processing devices, each hardware class lock being released to its associated one of the master device and slave devices, whereby each device, response to gaining control of its associated one of the hardware class locks, is enabled to resume executing its corresponding one of said computer program instruction streams.

3. The process of claim 2 including the further step of:
delaying a first one of the processing devices for a first selected amount of time relative to the remaining processing devices, after said release of control of the hardware class locks and before said first processing device resumes executing its corresponding one of the computer program instruction streams.

4. The process of claim 3 wherein:
said step of delaying a first one of the processing devices includes delaying at least a second one of the processing devices for an associated second selected amount of time, relative to the other processing devices, after said release of control of the hardware class locks and before said second device resumes executing its corresponding one of the computer program instruction streams.

5. The process of claim 2 including the further steps of:

(i) after each of said devices resumes executing its corresponding one of the computer program instruction streams, determining that an access to said shared resource by a first one of the processing devices occurred prior to an access to the shared resource by a second one of the devices;

(j) interposing a delay associated only with the first device, after said release of control of the hardware class locks and before each of the processing devices resumes executing its corresponding one of the computer program instruction streams, performing steps (b) through (h) again, then detecting access to the shared resource by the first and second processing devices;

(k) if the first processing device is detected to have gained access to the shared resource prior to the second processor once again, incrementing the delay to the first processing device and performing step (j) once again; and (l) repeating step (k) until the second processing device is detected to have gain access to the shared resource before the first processing device.

6. The process in claim 5 wherein:
said network further includes an intercommunication register means connecting all of the processing devices to one another, and the step of providing the synchronization message includes providing the synchronization message from the master device to the intercommunication register means.

7. The process of claim 6 wherein:
said intercommunication register means is comprised of a plurality of register segments, one of the register segments associated with each of the processing devices, and wherein the step of providing the synchronization message includes providing the synchronization message to the register segment associated with each of the slave devices.

8. The process of claim 7 wherein:
said step of causing each slave device to provide an acknowledgement message back to the master device includes causing each slave device to reset the contents of its associated one of the register segments.

9. The process of claim 2, wherein:
the step of setting the limit includes the steps of determining whether a proposed number for the limit is at least equal to the number of processing devices in the plurality of processing devices; and, if so, reducing the limit to one less than the number of processing devices.

10. The process of claim 2 wherein:
the computer program instructions include assembly level instruction streams residing in a main storage memory, and a horizontal microcode, resident in each of the processing devices, for decomposing the assembly level instruction streams into control words, each control word including a functional field for either gaining control of the hardware class locks or releasing control of the hardware class locks; and
wherein each of the processing devices provides a request for a selected one of the hardware class locks to all other processing devices prior to gaining control of the selected lock; each processing device, responsive to requesting one of the hardware class locks that is currently controlled by another one of the processing devices, being forced into a hold off condition; and
wherein said steps of causing each of the slave devices to request control of a different one of the hardware class locks, and causing the master device to issue a request for a remaining, unrequested one of the hardware class locks, include forcing each of the slave devices and the master device into the hold off condition.

11. The process of claim 10 wherein:
said processing devices resume executing their corresponding computer program instruction streams by executing end-operation instructions, the end-operation instruction corresponding to each of the processing devices being based on a control word in the horizontal microcode resident in the processing device.

12. The process of claim 2 wherein:
the data processing network further includes a processor intercommunication register for transmitting messages among the processing devices, and wherein steps (e) and (f) include sending these messages via the intercommunication register.

13. The process of claim 5 wherein:
steps (a) through (h) are performed pursuant to a computer program synchronization instruction comprising a 32-bit word having a plurality of data fields including a first field for identifying the instruction as a synchronization instruction, and a second field for identifying the location, within a main storage memory, of a synchronization control block.

14. The process of claim 13 wherein:
the synchronization control block is a 32-bit data word having a plurality of fields, including a first control field for designating the limit, a second control field for maintaining a current count of the number of the processing devices that have executed the synchronization instruction with the control block, and a third control field for identifying which ones of the processing devices have executed the synchronization instruction with the control block.

15. The process of claim 14 wherein:
said synchronization instruction further includes a third field for indicating the presence or absence of the delay, and a fourth field associated with the third field for indicating the value of the delay, said value to be incremented each time the synchronization instruction is executed.

16. The process of claim 6 wherein the step of causing each slave device, responsive to receiving the synchronization message, to provide an acknowledgement message back to the master device, includes the substeps of:
detecting an exception, and determining whether the exception is a multiprocessor message exception or an I/O exception; and
responsive to determining an I/O exception, rescinding the slave status of each of the slave devices.

17. The process of claim 16 including the further substeps of:
responsive to determining a multiprocessor message exception, determining whether a message is a synchronization message; and
responsive to determining the message is not a synchronization message, rescinding the slave status of each slave device; and alternatively, responsive to determining the message is a synchronization message, causing each slave device to provide the acknowledgement message.

* * * * *